United States Patent
Emmett et al.

(10) Patent No.: US 9,456,123 B2
(45) Date of Patent: Sep. 27, 2016

(54) METHOD AND SYSTEM TO CONFIGURE MOBILE ELECTRONIC DEVICE SETTINGS USING REMOTE DATA STORE ANALYTICS

(71) Applicant: Xerox Corporation, Norwalk, CT (US)

(72) Inventors: Phillip J. Emmett, Rochester, NY (US); Lina Fu, Fairport, NY (US); Raja Bala, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 22 days.

(21) Appl. No.: 14/574,809

(22) Filed: Dec. 18, 2014

(65) Prior Publication Data

US 2016/0182805 A1    Jun. 23, 2016

(51) Int. Cl.
| | |
|---|---|
| H04N 5/232 | (2006.01) |
| G06K 9/00 | (2006.01) |
| G06T 7/00 | (2006.01) |
| G06K 9/22 | (2006.01) |

(52) U.S. Cl.
CPC ...... H04N 5/23212 (2013.01); G06K 9/00483 (2013.01); G06K 9/22 (2013.01); G06T 7/0018 (2013.01); H04N 5/23206 (2013.01); H04N 5/23232 (2013.01)

(58) Field of Classification Search
CPC ............ H04N 5/23212; H04N 5/23206; H04N 5/23232; G06K 9/00483; G06K 9/22; G06T 7/0018
See application file for complete search history.

(56) References Cited

U.S. PATENT DOCUMENTS

| | | | |
|---|---|---|---|
| 6,061,092 A * | 5/2000 | Bakhle ........... | H04N 5/232 348/243 |
| 6,647,535 B1 | 11/2003 | Bozdagi et al. | |
| 6,947,609 B2 | 9/2005 | Seeger et al. | |
| 2001/0045986 A1 | 11/2001 | Edwards | |
| 2002/0186425 A1 | 12/2002 | Dufaux et al. | |
| 2006/0205394 A1 | 9/2006 | Vesterinen | |
| 2008/0079817 A1 | 4/2008 | Murata et al. | |
| 2008/0111892 A1 | 5/2008 | Kwon | |
| 2009/0024944 A1 | 1/2009 | Louch et al. | |
| 2009/0189999 A1 | 7/2009 | Noh | |
| 2009/0263028 A1 | 10/2009 | Kwon | |
| 2010/0026875 A1 * | 2/2010 | Shirai ............... | G03B 17/18 348/335 |
| 2010/0189356 A1 | 7/2010 | Sugita | |
| 2010/0202026 A1 | 8/2010 | Chiu et al. | |
| 2011/0109770 A1 | 5/2011 | Katoh | |

(Continued)

OTHER PUBLICATIONS

Johnson et al, publication of WO 2008/118367 from the World Intellectual Property Organization, Oct. 2008.*

Shafait et al., "Document Cleanup Using Page Frame Detection", International Journal on Document Analysis and Recognition, vol. 11, No. 2, 2008, pp. 81-96.

(Continued)

Primary Examiner — Nicolas Giles
(74) Attorney, Agent, or Firm — Fox Rothschild LLP

(57) ABSTRACT

A mobile electronic device application uses various hardware parameters for operation. The application leverages calibration data from other users to determine what the parameters should be for the particular device model on which the application is installed. The application queries a cloud-based data store by sending the model and a hardware-variable parameter to the data store. If a value for the parameter is available in the data store, the application will receive it from the data store and use it in operation. If the value is not available, the application will prompt the user to calibrate the application. The application will use the calibration results to identify a setting, and it will send the setting to the data store for use by other instances in which the application is installed on the same model device.

18 Claims, 6 Drawing Sheets

(56) References Cited

U.S. PATENT DOCUMENTS

| | | |
|---|---|---|
| 2011/0153612 A1 | 6/2011 | Paul et al. |
| 2012/0154608 A1* | 6/2012 | Ko ............... G11B 27/034 348/207.11 |
| 2012/0254768 A1 | 10/2012 | Aggarwal et al. |
| 2013/0124471 A1* | 5/2013 | Chen ............ H04N 5/23238 707/624 |
| 2013/0140356 A1 | 6/2013 | Fan et al. |
| 2013/0144527 A1* | 6/2013 | Kuhnreich ...... G01N 33/0075 702/2 |
| 2013/0155474 A1 | 6/2013 | Roach et al. |
| 2013/0254880 A1 | 9/2013 | Alperovitch et al. |
| 2014/0152849 A1 | 6/2014 | Bala et al. |
| 2015/0229826 A1* | 8/2015 | Ikeda ............... G03B 7/00 348/211.3 |

OTHER PUBLICATIONS

Ye et al., "Unsupervised Feature Learning Framework for No-reference Image Quality Assessment", IEEE International Conference on Computer Vision and Pattern Recognition (CVPR), Providence, RI, 2012.

Liu, et al., "Fast Directional Chamfer Matching", IEEE International Conference on Computer Vision and Pattern Recognition (CVPR), San Francisco, 2010.

U.S. Appl. No. 14/011,028, filed Aug. 27, 2013, "Flash/No-Flash Imaging for Binarization".

Kumar et al., "Mobile Video Capture of Multi-p. Documents", Computer Vision and Pattern Recognition Workshops (CVPRW) 2013, IEEE Conference, Jun. 23-28, 2013, 6 pp.

\* cited by examiner

METHOD AND SYSTEM TO CONFIGURE MOBILE ELECTRONIC DEVICE SETTINGS USING REMOTE DATA STORE ANALYTICS

BACKGROUND

Software applications that permit users to use standard portable electronic devices for document scanning are becoming increasingly valuable. The use of smartphones, tablets and other mobile devices for converting printed documents to an electronic format can help businesses and individuals streamline their document-related processes.

To accomplish this, mobile electronic device applications are available that capture images of printed artifacts, such as documents or other items that contain printed material on a substrate, and convert the documents to an electronic file. These applications use the camera and other sensors of the mobile device and employ various algorithms to perform document processing functions such as automatic photo capture, automatic page cropping, and geometric correction. However, in many cases, these applications must be deployed on a variety of devices. A single app may need to operate on phones from many manufacturers, or even on multiple generations of phones from a single manufacturer. The parameters required for the document processing algorithms can vary from device to device. Thus, a user may be required to perform set-up and/or calibration features upon installation of the app, so that the app then uses document processing parameters that are appropriate for the device. This can be time-consuming and frustrating for consumers.

This document describes methods and systems that are directed to solving at least some of the issues described above, and/or additional issues.

SUMMARY

In an embodiment, a mobile electronic device includes a processor, a non-transitory computer readable medium, a hardware element and programming instructions that, when executed cause the processor to configure an application of the device. The hardware element may be an image capturing sensor or other element, and it may have one or more hardware-variable parameters. The application interacts with the hardware element during operation. To configure the application, the device will: (i) detect a model of the electronic device; identify a hardware-variable parameter of the sensor or other hardware element; (ii) query a remote data store by sending the model and the parameter to the data store; (iii) receive a reply from the data store, wherein the reply comprises a value for the parameter; and (iv) use the value in the reply to establish a setting for the image capturing sensor of the electronic device. In some embodiments, the value may include the setting or it may be the setting. The device will then use the setting in operation of the software application.

In embodiments where the hardware element is an image capturing sensor, the device may receive, via the image capturing sensor, an image of a document. When using the setting in operation of the software application, the device may use the setting as a variable in a document processing application that generates an electronic file representing a scan of the document. For example, the parameter may include a sensor size for the image capturing sensor, and the setting may include an aspect ratio adjustment for the image capturing sensor that is based on the sensor size.

If the data store replies that the hardware-variable parameter for the model of the electronic device is not known in the data store, then the device may: (i) prompt a user of the electronic device to provide a calibration input for the application; (ii) when establishing the setting, use the calibration input to establish the setting; and (iii) send the established setting to the data store for storage in association with the model and the hardware-variable parameter. When prompting the user to provide the calibration input, the device may provide the user with one or more characteristics of a calibration document, and it may prompt the user to capture an image of the calibration document. Optionally, the device may also prompt the user to capture one or more additional images of the calibration document, such that the prompt includes an instruction to capture the one or more additional images with a geometry that is different from that used for one or more previously-captured images of the calibration document.

In an alternate embodiment, a processor may execute programming instructions that cause it to receive, from a first electronic device, a query comprising a model of the first electronic device and a hardware-variable parameter. The processor may access a data store to determine whether the data store includes the hardware-variable parameter for the model. If the processor determines that the data store does not include the hardware-variable parameter for the model, it may send the first electronic device an indication that data store does not include the hardware-variable parameter. In response to the indication, the processor may receive a setting for the hardware-variable parameter from the first electronic device. It may then: (i) store the setting in the data store in association with the model; (ii) receive, from a second electronic device, a query comprising the model and the hardware-variable parameter; (iii) access the data store to retrieve the setting for the hardware variable parameter; and (iv) transmit the setting to the second electronic device. For example, the parameter may comprise a sensor size for an image capturing sensor; and the setting may comprise a determined sensor size determined by the first electronic device or an aspect ratio adjustment determined by the first electronic device.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

For the purposes of this document, a "printed document," "printed artifact" or "artifact" refers to a substrate on which alphanumeric characters, images and/or other content items have been printed.

This document uses the terms "mobile electronic device" or "portable electronic device" to refer to a portable electronic device that includes an image capturing sensor (such as a camera), a processor and non-transitory, computer-readable memory. The memory may contain programming instructions in the form of a software application that, when executed by the processor, causes the device to perform one or image acquisition and processing operations according to the programming instructions. Examples of such devices include smartphones, personal digital assistants, cameras, tablet devices, electronic readers, personal computers, media players, satellite navigation devices and the like.

A portable electronic device may have various "hardware-variable parameters," which are parameters representing measurable or programmatic characteristics of the device. For example, hardware-variable parameters may include image sensor size, available memory, rules and/or requirements imposed on how the device manages its memory, flash geometry, and other characteristics.

The term "data store" refers to any repository or group of repositories for electronically storing one or more collections of data. Examples include a database, a file system or a directory.

This document may use the terms "application," "app" and "software application" interchangeably to refer to a computer-executable programming that is embodied in software and/or firmware.

As explained above, mobile electronic device applications are available that capture images of documents and convert the documents to an electronic file. These applications use the imaging device (i.e., camera) and other sensors of the mobile device and employ various algorithms to perform document processing functions such as automatic photo capture, automatic page cropping, and geometric correction.

Mobile electronic device operating systems must be configured to operate on a variety of devices. Because of this, application behavior and user experience can vary from device to device. Several of the algorithms used for document capture can require and/or benefit from knowledge of certain properties of the electronic device. However, these properties are not always known to the application developer, and the software application may not even be able to detect all such properties after the app is installed on the device.

Figure 1:
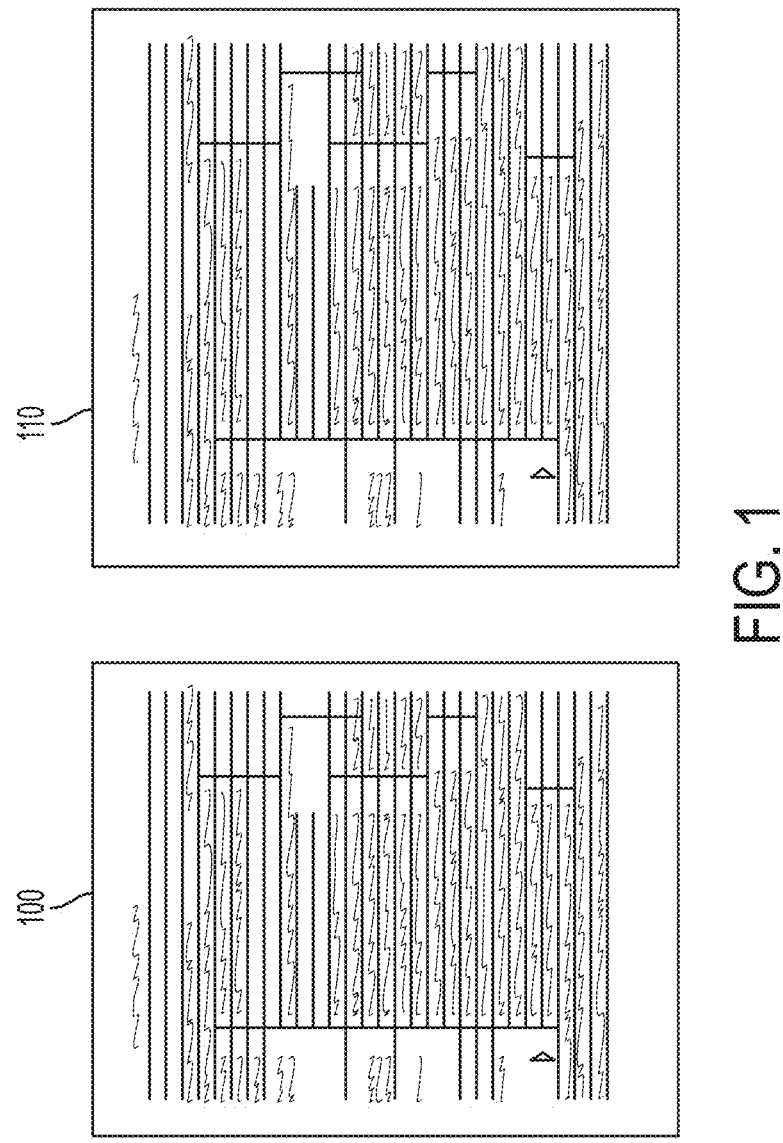
FIG. 1 depicts an example of how insufficient information about electronic device parameters can cause distortion of a captured image.

As an example, a geometric correction algorithm may require knowledge of the true aspect ratio of the document so that the final corrected image conforms to this ratio. Under certain conditions the aspect ratio can be computed directly from the image. However under other conditions, the image cannot be reliably used for aspect ratio calculation. In such cases, it is necessary to have additional information regarding characteristics of the mobile electronic device, such as camera focal length and sensor size. Sensor sizes can vary considerably across the numerous mobile models available today, and are often not readily accessible. If an application simply makes default assumptions on sensor size, FIG. 1 illustrates that the result may be that a document 100 is converted to electronic format with an incorrect geometric transformation 110.

Figure 2:
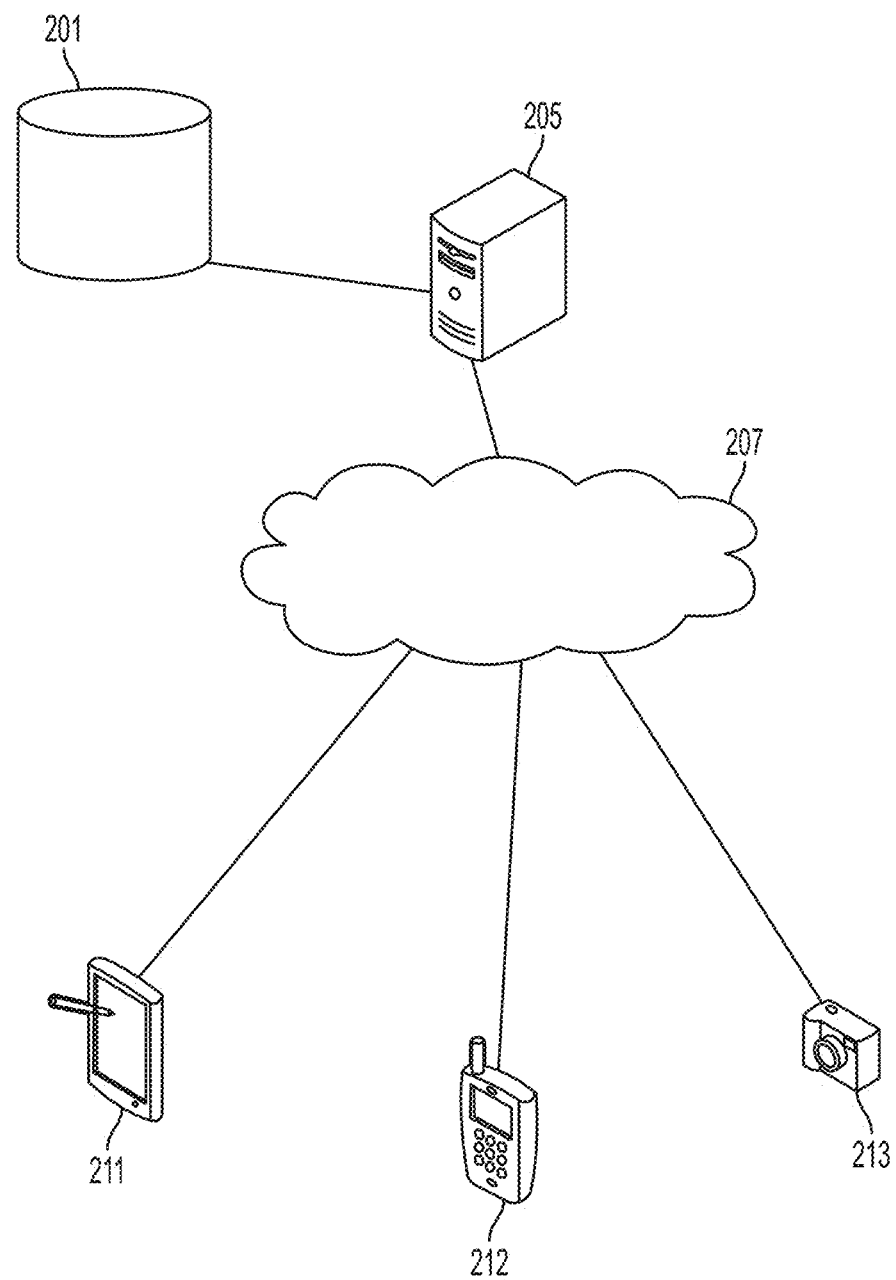
FIG. 2 illustrates a system for using crowd analytics to gather and distribute information relating to various mobile electronic devices.

To help remedy this problem, this document describes a method and system that automatically and dynamically gathers information, parameters, and properties relevant to an image capturing application and various mobile electronic devices from user base. It then makes this information available to the same user base and future users to improve user experience and reduce the need for set-up and calibration time in future installations. FIG. 2 illustrates basic elements of an embodiment of such a system. A data store 201 hosted on one or more cloud-based storage facilities contains an accumulating body of hardware variable device parameters that that can be written to and read from by instances of a software application installed on any number of various mobile electronic devices 210-213.

When a particular device (e.g., 210) executes an application such as an image capturing application, the application may cause the device to provide or seek one or more certain hardware-variable parameters regarding the device or another application installed in the device. If the parameter cannot be retrieved locally on the device, the application may cause the device to transmit a query to a server 205 via a communication network 203 such as a mobile phone network, an intranet, a wi-fi network, the Internet, any other network or combination of networks. The request received from a particular mobile electronic device may include a identifying information about the device, such as make and/or model identifiers, manufacturer name, a serial number, or other identifying information (all of which may be referred to herein as "model" data). The server 205 may include a processor and a computer readable memory containing programming that, when executed, causes the server to perform various functions. The server 205 may receive the request and query the data store 201 to determine whether the device model is known, and whether any hardware-variable parameters are available for the model. If an entry exists, the server may return the parameter(s) to the electronic device to be stored for future use in operations such as image processing operations.

If a data store entry does not exist for the model (which may be the case if, for example, this is the first instance of the image capture application running on a given device model), the app may cause the device to attempt to estimate or determine the parameter(s). In one embodiment this may be accomplished via an initial, one-time or limited time calibration procedure wherein the application and hardware behavior and response are monitored and/or measured under a certain known and/or controlled conditions. The application may use the monitored and measured behavior to determine the parameter(s) for the device. Once completed, the newly-estimated parameter(s) may be stored on the device and/or transmitted to the remote server 205 to be stored in the cloud-based data store 201. In this way, other users of the same type of device may access and use this information after installing the app on their device. Parameters stored in the data store may be refined and/or improved as measured behavioral and response experiences are received from different mobile devices. The system thus dynamically leverages crowd usage to continually accumulate app-specific knowledge and improve the quality and robustness of the app, providing superior and/or robust performance and experience across varied mobile platforms. With this cumulative intelligence, the likelihood that some user in the world has contributed information about a particular device increases over time, and consequently the need for any given user to do calibration or setup may be reduced over time.

Figure 3:
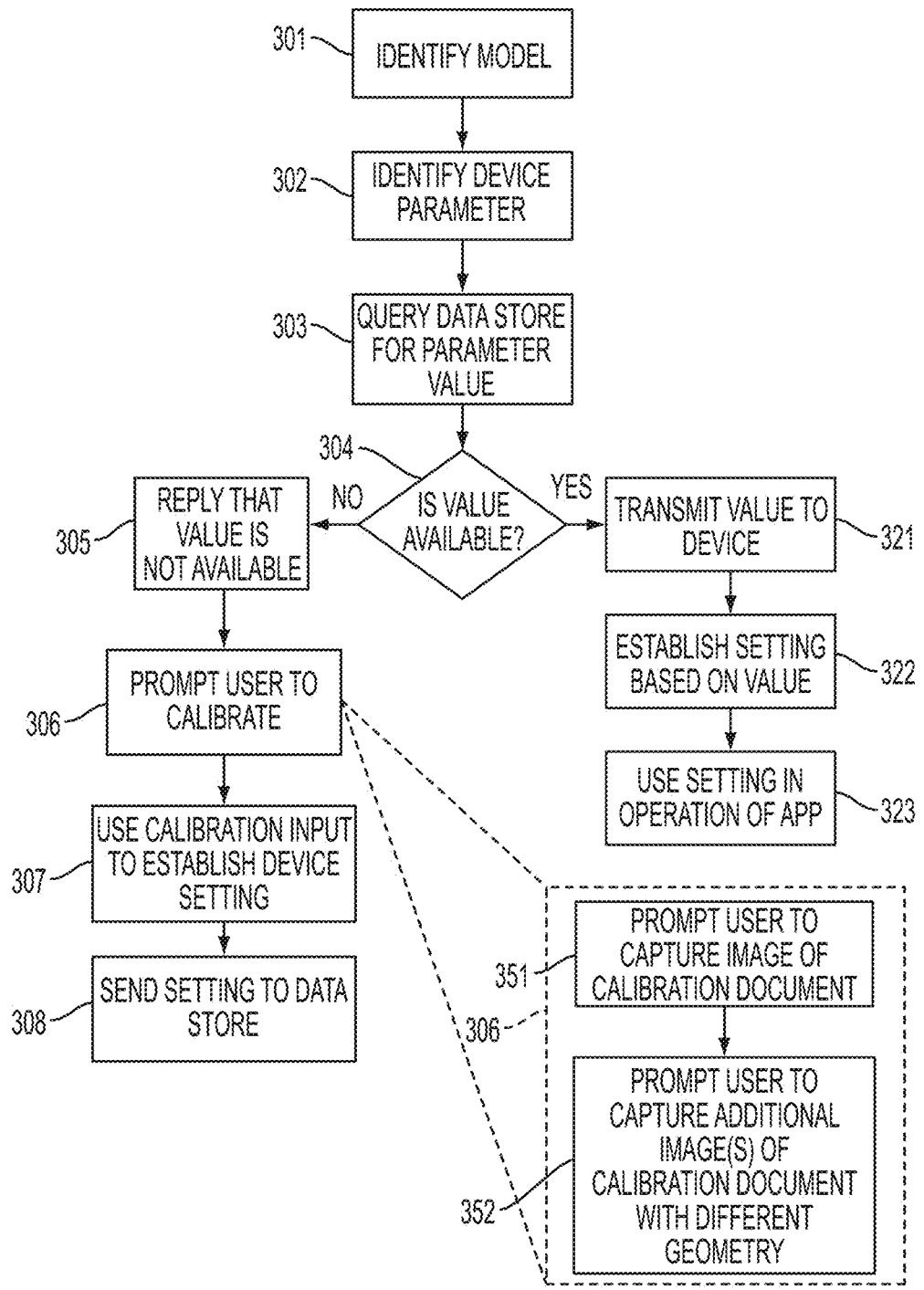
FIG. 3 is a flowchart that illustrates an example of an application optimization process.

FIG. 3 is a flowchart illustrating various steps of a method of dynamically optimizing operation of a software application on a mobile device using crowd analytics. As an early or first step of the method, such as when the application is first launched on a mobile electronic device, the app may query the device to retrieve a make, model or other identifying information of the device (301) For example, the system may do this by automatically detecting this information as stored in the device's memory, or by receiving the information as input by a user. This document uses the term "model" as a generic term to include all data that can be used to identify a manufacturer, type or model of an electronic device.

The app may then identify a hardware-variable parameter of operation of the electronic device (302). The parameter will be one that is used in operation of the application, and which may vary based on a particular hardware element with which the application interacts during operation. An example hardware element is an image sensor that may be accessed by a document scanning application. In this case, the document scanning application may use the image sensor size as a hardware-variable parameter in a document scanning operation. Other examples include, without limitation: (i) image capturing applications and image sensors; (ii) wi-fi connecting applications and transceivers; or (iii) document editing or presentation applications and display devices. The app may then cause the device to query a data store for the parameter value (303) by sending a query to a remote server. The query may include the model and the hardware-variable parameter.

The server will access the data store and determine whether an entry containing the device model and corresponding parameter value is available (304). If such an entry is not available, the server will send a reply comprising an indication that the parameter for the model is not available in the data store (305). Upon receipt of such a reply, the app may cause the device to prompt a user to provide a calibration input for the application (306), such as a one-time camera calibration. As an example, the application may provide the user with characteristics of a document and prompt the user to capture an image of a calibration document. A calibration document will be a document that the system knows has the provided characteristics, such as a reference document or a template document. An example of such characteristics may be a known aspect ratio, such as 8.5 inches by 11 inches, or size A4. When the device receives the calibration input, it may use the calibration input to establish a setting for the hardware-variable parameter (307). For example, it may compare the known aspect ratio to the aspect ratio of the captured image of the calibration document to determine the size of the image sensor and/or a factor that is based on the image sensor size (such as an aspect ratio adjustment factor). Additional examples of this procedure will be described in more detail below. It may then send the established setting to the data store for storage in association with the model and the hardware-variable parameter (308).

Alternatively, if the parameter for the device is available in the data store, then the remote server may transmit the parameter's value to electronic device (321). The parameter may be available in the data store if, for example, a prior user provided calibration data, or if the data store operator received it from a device manufacturer or any other source. The device's application will then use the parameter to establish a setting for the electronic device (322). For example, if the parameter is an image sensor size, then the application may use the sensor size to determine an aspect ratio adjustment factor that will be used when the application processes an image that is captured by the image sensor. The system will then use the setting in operation of the software application (323), such as by using the aspect ratio adjustment factor in an image processing algorithm to maintain or improve quality of the captured image.

Steps 321-323 described above also may be available to a second electronic device after a first electronic device has performed steps 305-308. In this way, the output of the calibration may be both available to and sourced from the crowed, so that various users of the app may benefit from the efforts of others.

Once a device parameter is obtained by the data store, additional users of the application on the same device may be able to help improve the accuracy of the parameter by also performing the calibration procedure. For example, the server associated with the data store may include programming that only makes a particular model device parameter available for public use if at least a threshold number of users of that model of the device have performed the calibration procedure and submitted the corresponding data. In addition, if the data store receives settings from multiple devices of a particular model, the server may implement certain data quality assurance techniques, such as by averaging the received settings, discarding outliers (such as a highest and lowest setting) and/or using other normalizing techniques. The server may then store the quality-controlled data in the data store for use by other users of the particular device model.

In addition, the system may periodically prompt data quality checks by periodically prompting one or more users to re-perform the calibration procedure. This may occur after a particular time period has passed since the initial calibration was done, after the system has received a particular number of queries for a particular model, if the system detects repeated queries from an individual device (or at least a threshold number of repeated inquiries within a time period), or whenever a user chooses to initiate a voluntary calibration procedure. The application may provide users with one or more incentives to perform the initial calibration and/or subsequent calibrations, such as a prioritized service, the unlocking of one or more features of the application, or other promotions that may or may not relate to the process of the application.

In addition to image sensor settings, the system may use the process to dynamically optimize other device parameters based on crowd knowledge. Examples include: (i) statistics on camera shake during automatic photo capture; (ii) time to auto-capture for a given user on a given device; (iii) image quality score of captured images vs. back-end optical character recognition performance; (iv) processor performance that could be used to enable and/or disable certain scan features; and (v) knowing how much memory is nominally allocated to the app by the operating system.

The system described above may use various types of calibration procedures. For example, as described above and as shown in FIG. 3 for the call out box for step 306, the application may prompt the user to capture an image of a calibration document or it may provide the user with characteristics of a document (such as a particular aspect ratio) that the user knows will have those characteristics 351 (which document would then be considered to be a calibration document). Optionally, the system may prompt the user to take multiple images of the calibration document, optionally with additional instructions such as to take a first image using different geometries than the original image of the calibration document 352. For example, it the original image of the calibration document was taken from a particular incident angle (e.g., perpendicular to the document's surface), the system may prompt the user to use the image capturing sensor to capture a second image of the calibration document from a different incident angle. When the device receives the calibration input, it may use the calibration input to establish a setting for the hardware-variable parameter. The system may use image processing techniques such as any now or hereafter known border-detection techniques, to estimate the sensor size.

As an example, to crop a mobile-captured image and eliminate unwanted background, and to simultaneously perform a geometric correction to produce a rectangular page, the application may: (i) detect the document borders that form a quadrilateral Q; (ii) defining the target rectangle R to which the quadrilateral is to be mapped; and (iii) perform a standard perspective (homographic) mapping from Q to R.

For the first step above, document border detection may be achieved via an automatic algorithm in conjunction with optional manual input. The third step above includes procedures now and hereafter known to those of skill in the art. We thus focus here on the second step of defining the target rectangle. This may require knowledge of the document's aspect ratio, and one of the two dimensions of the image in pixels. In an embodiment implementation, the latter may be obtained by fitting the tightest bounding rectangle around Q. Thus the rest of the discussion focuses on how to determine the document aspect ratio r.

If the user captures the document with very good alignment (i.e. the camera plane is almost parallel to document plane, resulting in a perpendicular angle of incidence), the aspect ratio can be estimated directly from the tightest bounding rectangle. However, if alignment is poor, and there is significant perspective distortion, then the system may use additional knowledge to determine r. Optionally, an app may require the user to specify the document type prior to capture, and this information can be used to look up the value for r. Alternatively, the app may not require the user to provide this information, and instead it may estimate the aspect ratio using procedures on its own.

Figure 4:
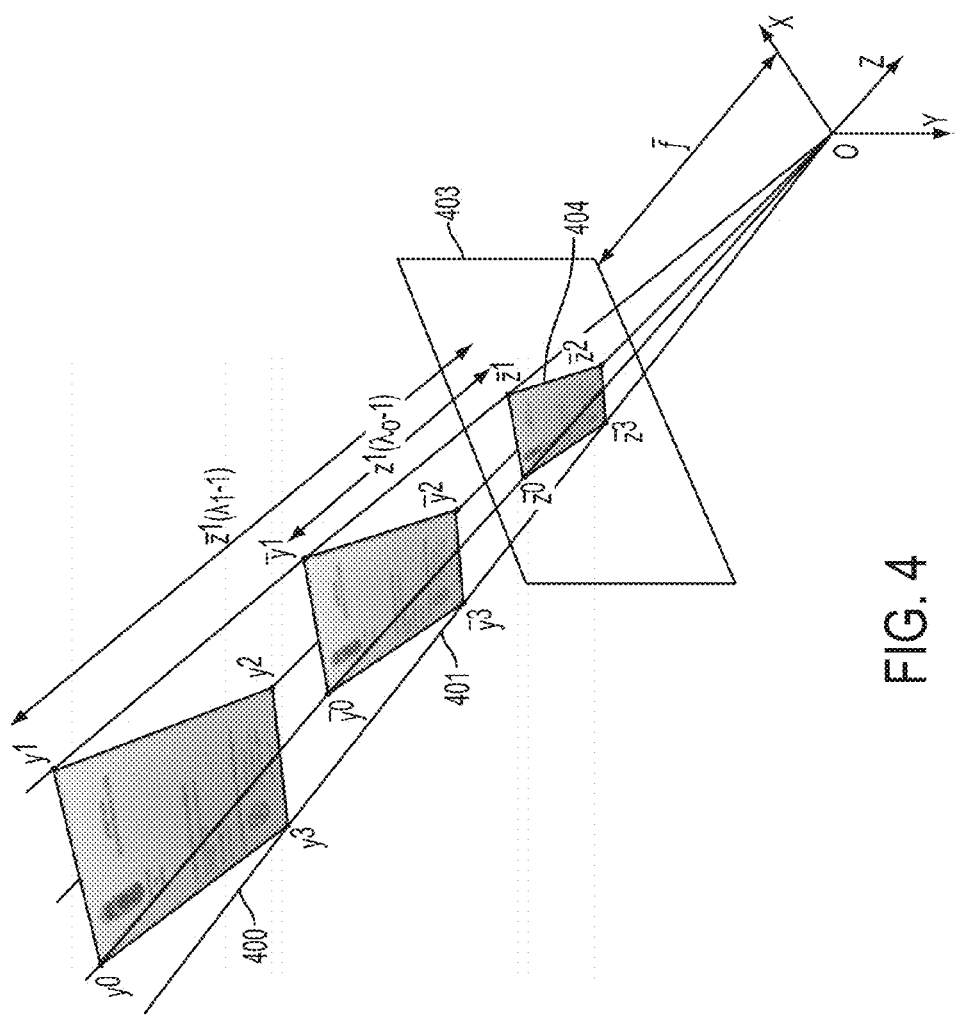
FIG. 4 illustrates a pinhole camera model for document image capture.

One embodiment of an approach for accomplishing this assumes a model for the camera capture and certain constraints on the document. One such technique is described in J. Rodriguez-Pineiro et al., "A new method for perspective correction of document images," published in Document Recognition and Retrieval XVIII, Proceedings of SPIE Vol. 7874 (SPIE, Bellingham, W A 2011). The system may assume a pinhole camera model, as shown in FIG. 4 of this document (and a similar version of which appears in Rodriguez-Pinto et al.), and it may assume that the document page is rectangular. FIG. 4 represents a transformation of an actual document 401 to a scaled document 400, as well as an imaged document 404 on an image plane 403.

In this model, the system may let $(z_1^0, z_2^0), (z_1^1, z_2^1), (z_1^2, z_2^2), (z_1^3, z_2^3)$ be the x-y coordinates of the four document corner vertices in the image plane. Applying the fact that opposite edges of the document are parallel results in the following formula that relates the four vertices to the camera focal length f defined in pixel units:

$$\begin{pmatrix} z_1^1 & -z_1^2 & z_1^3 \\ z_2^1 & -z_2^2 & z_2^3 \\ f & -f & f \end{pmatrix} \begin{pmatrix} \lambda_1 \\ \lambda_2 \\ \lambda_3 \end{pmatrix} = \begin{pmatrix} z_1^0 \\ z_2^0 \\ f \end{pmatrix} \quad (1)$$

where $\lambda_1, \lambda_2, \lambda_3$ are effectively scaling factors that relate the three-dimensional (3D) coordinates of each vertex with its corresponding projection into the two-dimensional (2D) image plane. The system may solve for $\lambda_i$ by setting f=1. The system may then compute the true value of f by applying the constraint that two adjacent edges of the document are orthogonal in 3D. This results in f being the positive square root of:

$$-\frac{\left[\begin{pmatrix} z_1^0 \\ z_2^0 \end{pmatrix} - \lambda_3 \begin{pmatrix} z_1^3 \\ z_2^3 \end{pmatrix}\right]^T \cdot \left[\begin{pmatrix} z_1^0 \\ z_2^0 \end{pmatrix} - \lambda_1 \begin{pmatrix} z_1^1 \\ z_2^1 \end{pmatrix}\right]}{(1-\lambda_3)(1-\lambda_1)}. \quad (2)$$

Finally, the aspect ratio of the document may be given by:

$$r = \frac{\|z^0 - \lambda_1 z^1\|}{\|z^0 - \lambda_3 z^3\|} \quad (3)$$

where $z^i$ are now 2D vectors given by $[z_1^i, z_2^i]$.

When the captured image fails to meet certain geometric conditions, either $\lambda_1$ or $\lambda_3$ can approach 1, and this produces a singularity in the calculation of the focal length in Equation (2) above, which in turn may result in failure to compute the document aspect ratio (3). The system can use additional camera information to address this problem. Namely the system may note the following relationship between physical and digital measurement units:

$$s_w/w = f_p/f. \quad (4)$$

where $s_w$ is the camera sensor width in mm, w is the image width in pixels, $f_p$ is the camera's physical focal length in mm, and as before, f is the digital focal length in pixels. Image width w is known, and $f_p$ can be found in the exchangeable image file format (EXIF) data of the image or by querying the camera properties within the mobile app. Thus if the sensor size $s_w$ is known, then the system may use Equation (4) above to solve for f, and therefore the aspect ratio using Equation (3) above.

On the other hand, if the sensor size is unknown, the system may resort to a calibration procedure as described above, where the user is prompted to capture an image of a document with known aspect ratio. The captured image may be required to satisfy certain conditions. For example, the system may require that there be some amount of perspective, and that at least one pair of parallel edges of the document are non-parallel in the image plane. From this image, the system may then extract the page bounding quadrilateral Q and the vertices $z^i$. Equations (1) and (3) may be used to provide the system with a solution for f, which it may then use in Equation (4) to yield the image sensor width $s_w$. Finally, the latter may be stored both in the cloud data store and on the mobile electronic device for future robust calculations of document aspect ratio. To provide numerical stability, the calibration module could check that the estimated sensor size is plausible, and if not, search an available data set of standard sensor sizes to select one that minimizes the aspect ratio error.

Figure 5:
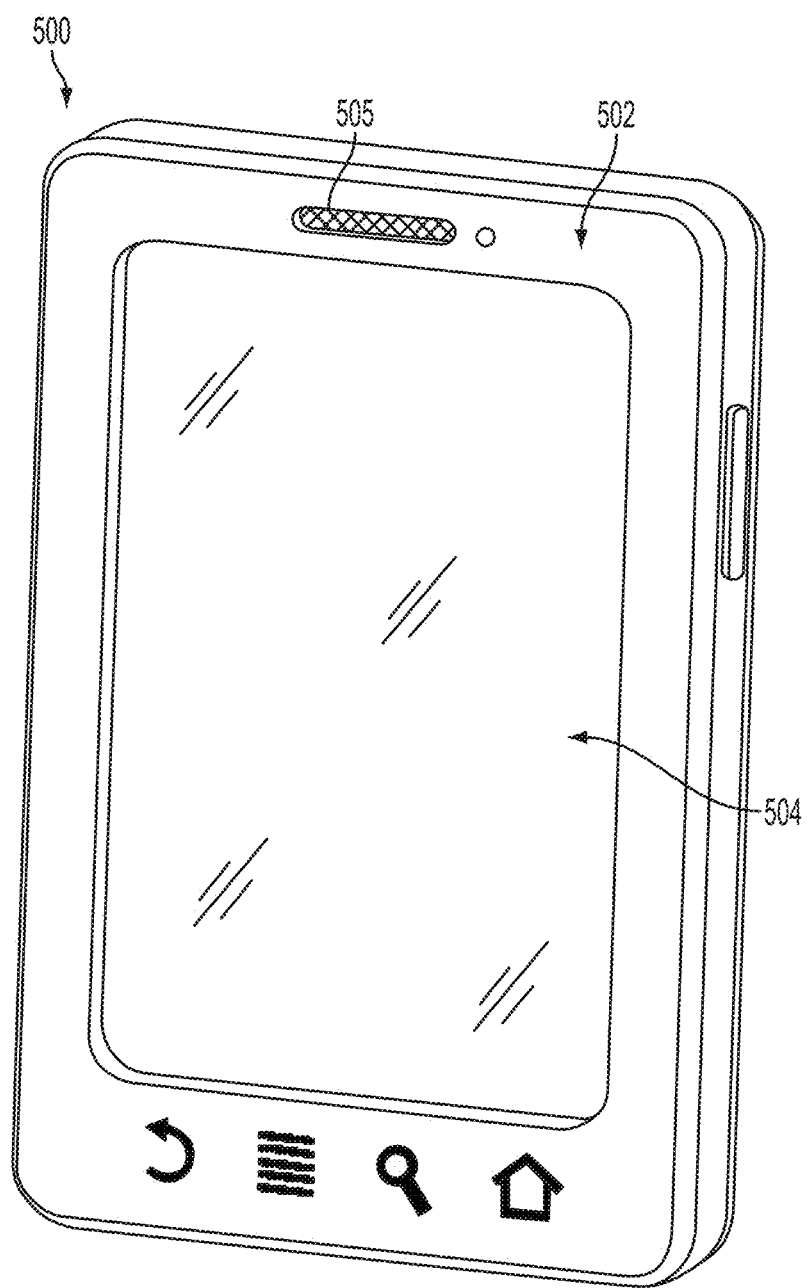
FIG. 5 illustrates a first view of an example mobile electronic device.

FIG. 5 shows one example of a mobile electronic device, generally designated 500. The mobile electronic device 500 may include a front face 502 and a display 504. The display 504 may be any suitable component for displaying images, including, but not limited to, electroluminescent displays, electronic paper displays, vacuum fluorescent displays, light emitting diode (LED) displays, cathode ray tube (CRT) displays, liquid crystal (LCD) displays, plasma display panels, digital light processing (DLP) displays, and organic light-emitting diode (OLED) displays. The device also may include a user interface such as a keypad, audio input, and/or touch-sensitive components of the display 504. The device will include a processor and a non-transitory, computer readable memory containing programming instructions that, when executed by the processor, cause the device to perform various functions.

Figure 6:
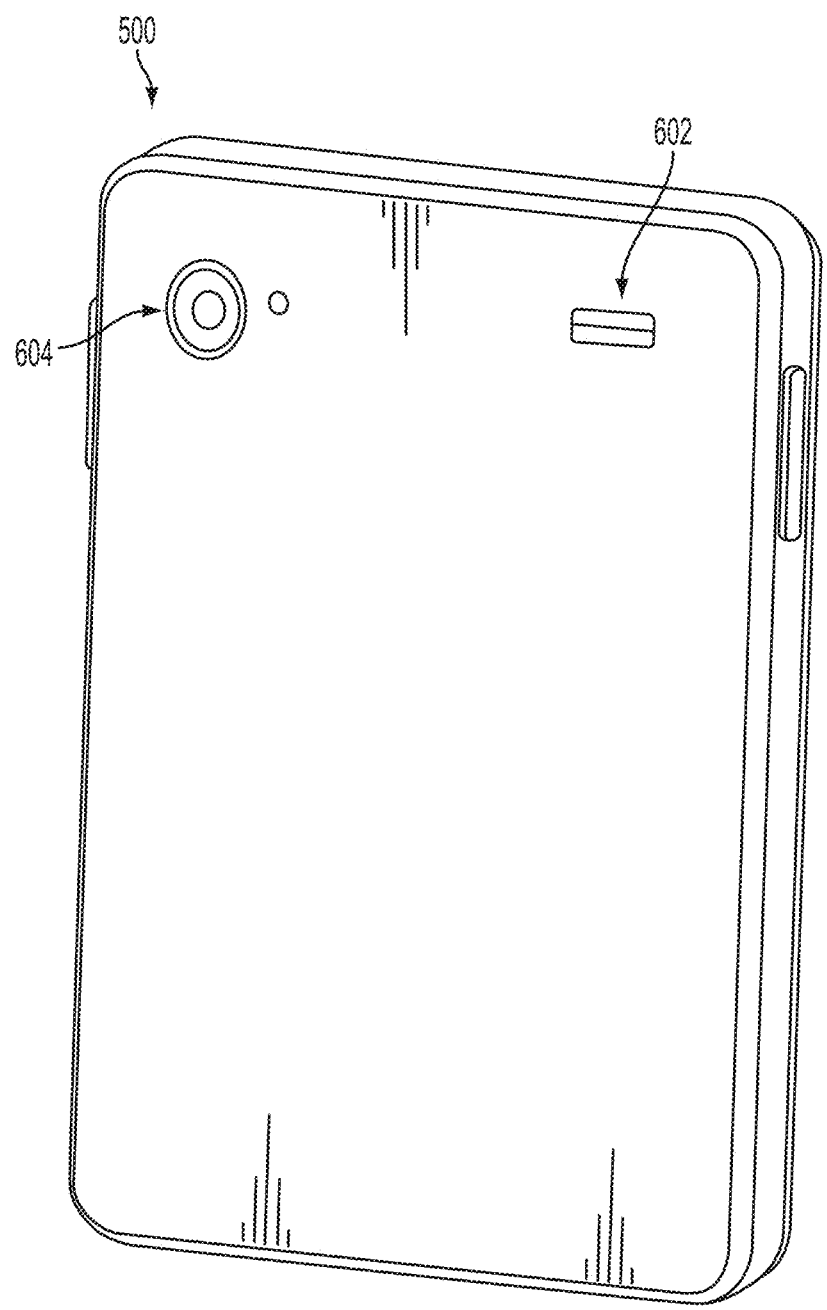
FIG. 6 illustrates another view of the example mobile electronic device.

FIG. 6 shows a rear face 602 of the mobile electronic device 500. The rear face 602 may include an image capture device 604. The image capture device 604 may be any suitable component capable of receiving an optical image and transmitting the information to other components for processing.

While the image capture device 604 is depicted on the rear face of this example, persons skilled in the art will appreciate that the image capture device 604 may be positioned at any location upon any face of the mobile electronic device 600, or it may even be external to the mobile device 600 and connected by any means of electronic communication, including, but not limited to, physical cable communication such as universal serial bus (USB), wireless radio communication, wireless light communication, or near field communication technology.

In some embodiments, the display 504 may be positioned within the mobile device 500, and may be configured in such a way so as to display the output of the imaging device 604 in real time so that the user may view the display 504 and see the output of the imaging device 604 on the display. The display 504 is one type of user interface that the device may include. The device may include other types of user interfaces such as an audio output 505. such as a speaker or audio port. Accordingly, the configuration of the mobile device 500 as shown in FIGS. 5 and 6 is only an example, and persons skilled in the art will appreciate other configurations that are able to achieve a similar overall result.

While the examples discussed above relate to software applications that are document capture and processing applications, other the methods described above may be applied to other applications that rely on sensed input for operation or action. Examples include any type of image capture application, video capture applications, audio capture applications, touch-sensitive applications that rely on an electronic device's touchscreen for user input, and other applications.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of configuring an application of a mobile electronic device, comprising:
by a processor of a mobile electronic device, executing programming instructions for a software application installed on the electronic device by:
detecting a model of the electronic device;
identifying a hardware-variable parameter of an image capturing sensor of the electronic device;
querying a data store by sending the model and the parameter to the data store;
receiving a reply from the data store, wherein the reply comprises a value for the parameter;
if the reply indicates that the hardware-variable parameter for the model of the electronic device is not known in the data store:
prompting a user of the electronic device to provide a calibration input for the application by:
providing the user with one or more characteristics of a calibration document, and
prompting the user to capture an image of the calibration document,
using the calibration input to establish a setting, and
sending the established setting to the data store for storage in association with the model and the hardware-variable parameter;
otherwise:
based on the reply, establishing a setting for the image capturing sensor of the electronic device, and
using the setting in operation of the software application.

2. The method of claim 1:
further comprising receiving, via the image capturing sensor, an image of a document;
wherein using the setting in operation of the software application comprises using the setting as a variable in a document processing application that generates an electronic file representing a scan of the document.

3. The method of claim 1 wherein the reply comprises the setting.

4. The method of claim 1, wherein the parameter comprises a sensor size for the image capturing sensor, and the setting comprises an aspect ratio adjustment for the image capturing sensor that is based on the sensor size.

5. The method of claim 1, wherein:
prompting the user of the electronic device to provide the calibration input also comprises prompting the user to capture one or more additional images of the calibration document, wherein the prompt includes an instruction to capture the one or more additional images with a geometry that is different from that used for one or more previously-captured images of the calibration of document; and
using the calibration input to establish the setting also comprises using one or more of the additional images of the calibration document in conjunction with the characteristics of the calibration document to establish the setting.

6. A method of configuring a mobile electronic device, comprising:
by a processor of a mobile electronic device, executing programming instructions for a software application installed on the electronic device by:
detecting a model of the electronic device;
identifying a hardware-variable parameter of operation of the electronic device;
querying a data store by sending the model and the hardware-variable parameter to the data store;
receiving a reply from the data store, wherein the reply comprises an indication that the parameter for the model is not available in the data store;
prompting a user of the electronic device to provide a calibration input for the application by:
providing the user with one or more characteristics of a calibration document, and
prompting the user to capture an image of the calibration document;
receiving the calibration input;
using the calibration input to establish a setting for the hardware-variable parameter; and sending the established setting to the data store for storage in association with the model and the hardware-variable parameter.

7. The method of claim 6:
further comprising receiving, via an image capturing sensor of the electronic device, an image of a document; and
wherein using the calibration input to establish a setting comprises using the setting as a variable in a document processing application that generates an electronic file representing a scan of the document.

8. The method of claim 7, wherein:
the parameter comprises a sensor size for the image capturing sensor;
the calibration input comprises an image of a calibration document captured by the image capturing sensor of the electronic device and an aspect ratio of the calibration document;
using the calibration input to establish a setting comprises determining, based on the aspect ratio and one or more characteristics of the image of the calibration document, the sensor size or an aspect ratio adjustment for the image capturing sensor; and
sending the established setting to the data store comprises sending the determined sensor size or aspect ratio adjustment to the data store.

9. The method of claim 8 further comprising, by an image capturing sensor of the electronic device, receiving the image of the calibration document before using the calibration input to establish the setting.

10. The method of claim 6, wherein:
prompting the user of the electronic device to provide the calibration input also comprises prompting the user to capture one or more additional images of the calibration document, wherein the prompt includes an instruction to capture the one or more additional images with a geometry that is different from that used for one or more previously-captured images of the calibration document; and
using the calibration input to establish the setting comprises using the additional one or more images of the calibration document in conjunction with the one or more characteristics of the calibration document to establish the setting.

11. The method of claim 6, further comprising, by a processor of a second mobile electronic device, executing programming instructions for a second instance of the software application installed on the second electronic device by:
detecting a model of the second electronic device;
identifying a hardware-variable parameter of the second electronic device;
querying the data store by sending the model of the second electronic device and the parameter of the second electronic device to the data store;
receiving a second reply from the data store, wherein the second reply comprises a value for the parameter of the second electronic device;
based on the second reply, establishing a setting for the second electronic device; and
using the setting for the second electronic device in operation of the second instance of the software application.

12. A method, comprising:
by a processor, executing programming instructions that cause the processor to:
receive, from a first electronic device, a query comprising a model of the first electronic device and a hardware-variable parameter that corresponds to a hardware element;
access a data store to determine whether the data store includes the hardware-variable parameter for the model;
determine that the data store does not include the hardware-variable parameter for the model, and send the first electronic device an indication that data store does not include the hardware-variable parameter;
in response to the indication:
prompt, by the first electronic device, a user of the first electronic device to provide a calibration input for the application by:
providing the user with one or more characteristics of a calibration document, and
prompting the user to capture an image of the calibration document,
by the first electronic device, use the calibration input to establish a setting for the hardware-variable parameter, and
receive the setting for the hardware-variable parameter from the first electronic device;
store the setting in the data store in association with the model;
receive, from a second electronic device, a query comprising the model and the hardware-variable parameter;
access the data store to retrieve the setting for the hardware variable parameter; and
transmit the setting to the second electronic device.

13. The method of claim 12, wherein:
the hardware element comprises an image capturing sensor; and
the setting comprises a sensor size determined by the first electronic device for the image capturing sensor or an aspect ratio adjustment determined by the first electronic device for the image capturing sensor.

14. A mobile electronic device configuration system, comprising:
a mobile electronic device comprising a processor and a non-transitory computer-readable memory containing programming instructions that, when executed, cause the processor to:
identify a hardware-variable parameter of operation of the mobile electronic device;
query a data store that is remote to the mobile electronic device by transmitting a message that includes the parameter and a model of the mobile electronic device to the data store;
if a value for the parameter is available in the data store:
receive a reply from the data store, wherein the reply comprises the value for the parameter,
based on the reply, establish a setting for a hardware element of the mobile electronic device that corresponds to the parameter, and
use the setting in operation of a software application that interacts with the hardware element during operation; and
if the value of the parameter is not in available in the data store:
receive a reply from the data store, wherein the reply comprises an indication that the parameter for the model is not available in the data store,
prompt a user of the mobile electronic device to provide a calibration input for the application by:

providing the user with one or more characteristics of a calibration document, and prompting the user to capture an image of the calibration document, receive the calibration input;

use the calibration input to establish a setting for the hardware-variable parameter, send the established setting to the data store for storage in association with the model and the hardware-variable parameter, and use the setting in operation of a software application that interacts with the hardware element during operation.

15. The system of claim 14, wherein:

the hardware element comprises an image capturing sensor; and the setting comprises a determined sensor size determined by the mobile electronic device or an aspect ratio adjustment determined by the mobile electronic device.

16. The system of claim 15, further comprising additional programming instructions that, when executed, cause the processor to:

receive, via the image capturing sensor, an image of a document; and when using the setting in operation of a software application, using the setting as a variable in a document processing application that generates an electronic file representing a scan of the document.

17. The system of claim 15, wherein prompting the user to capture the image of the calibration document comprises:

prompting the user to capture the image of the calibration document via the image capturing sensor, wherein the prompt includes an instruction to capture the image of the calibration document with a geometry that is different from that used for one or more previously-captured images of the calibration document.

18. The system of claim 14, further comprising a second mobile electronic device comprising a second processor;

a second instance of the hardware element; and a second non-transitory computer-readable memory containing programming instructions that, when executed, cause the second processor to:

query the data store by transmitting a message that includes the parameter and a model of the second mobile electronic device to the data store;

receive a second reply from the data store, wherein the second reply comprises a second value for the parameter;

use the second value to establish a second setting for the second instance of the hardware element, and use the second setting in operation of a software application that interacts with the second instance of the hardware element during operation.

* * * * *